United States Patent
Massavie et al.

(10) Patent No.: US 12,294,314 B2
(45) Date of Patent: May 6, 2025

(54) ZERO VOLTAGE SWITCHING POWER CONVERTER

(71) Applicant: Commissariat à l'Energie Atomique et aux Energies Alternatives, Paris (FR)

(72) Inventors: Vincent Massavie, Grenoble (FR); Ghislain Despesse, Grenoble (FR); Sébastien Carcouet, Grenoble (FR); Xavier Maynard, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 157 days.

(21) Appl. No.: 17/805,915

(22) Filed: Jun. 8, 2022

(65) Prior Publication Data
US 2022/0399832 A1 Dec. 15, 2022

(30) Foreign Application Priority Data
Jun. 9, 2021 (FR) ...................................... 2106069

(51) Int. Cl.
*H02M 7/537* (2006.01)
*H02M 1/00* (2006.01)
*H02M 1/08* (2006.01)

(52) U.S. Cl.
CPC ......... *H02M 7/537* (2013.01); *H02M 1/0058* (2021.05); *H02M 1/08* (2013.01)

(58) Field of Classification Search
CPC ............................ H02M 1/0058; H02M 7/537
See application file for complete search history.

(56) References Cited

U.S. PATENT DOCUMENTS

| | | | |
|---|---|---|---|
| 7,924,577 B2* | 4/2011 | Jansen | H02M 3/33507 363/21.02 |
| 2007/0247198 A1 | 10/2007 | Moindron | |
| 2009/0295228 A1* | 12/2009 | Ochi | H02M 3/156 307/66 |
| 2010/0225290 A1* | 9/2010 | Nalbant | H02M 3/156 323/282 |
| 2018/0153008 A1* | 5/2018 | Luccato | H02M 1/4225 |
| 2019/0246465 A1* | 8/2019 | Linnartz | H02M 1/08 |

FOREIGN PATENT DOCUMENTS

| | | |
|---|---|---|
| JP | H08330874 A | 12/1996 |
| JP | 2007014139 A | 1/2007 |

OTHER PUBLICATIONS

Preliminary Search Report for French Application No. 2106069 dated Feb. 11, 2022, 2 pages.

* cited by examiner

*Primary Examiner* — Alex Torres-Rivera
(74) *Attorney, Agent, or Firm* — Jordan IP Law, LLC

(57) ABSTRACT

The present description concerns a power converter (400) comprising: a switch (114) comprising first (114*d*) and second (114*s*) conduction terminals intended to receive a first AC voltage (Vds), a first circuit (402) for detecting a minimum value reached by the first voltage at each half-wave, and for averaging minimum values over a plurality of halfwaves, and a second circuit (404) for controlling the switch configured, according to the average of said values, to turn on the switch when the first voltage is substantially null.

12 Claims, 3 Drawing Sheets

ZERO VOLTAGE SWITCHING POWER CONVERTER

FIELD

The present disclosure generally concerns electronic devices. The present disclosure more specifically concerns power converters.

BACKGROUND

Among existing power converters, inverters enabling to convert a DC input voltage into an AC output voltage are for example known. Existing inverters however exhibit operating drifts particularly linked to ambient condition variations and to aging phenomena.

SUMMARY

There is a need to improve known power converters.

An embodiment overcomes all or part of the disadvantages of known power converters.

An embodiment provides a power converter comprising:
a switch comprising first and second conduction terminals intended to receive a first AC voltage;
a first circuit for detecting a minimum value reached by the first voltage at each halfwave, and for averaging minimum values over a plurality of halfwaves; and
a second circuit for controlling the switch configured, according to the average of said values, to turn on the switch when the first voltage is substantially null.

According to an embodiment, the first circuit has a time constant at least five times greater, preferably at least ten times greater, than a period of the first voltage.

According to an embodiment, the first circuit comprises, between a first node coupled, preferably connected, to the first conduction terminal of the switch and a second node of application of a reference potential, a halfwave rectification element in series with a parallel association of a capacitive element and of a resistor.

According to an embodiment, a third node, located between the halfwave rectifying element and the parallel association of the capacitive element and of the resistor, exhibits a potential which is a function of a lower envelope of the first voltage.

According to an embodiment, the halfwave rectification element is a diode.

According to an embodiment, the first circuit further comprises a source of a voltage coupled, preferably connected, between the parallel association of the capacitive element and of the resistor and the second node.

According to an embodiment, the second circuit is further configured to modify a duty cycle of the switch according to the average of said values.

According to an embodiment, the switch is a field-effect transistor, the first and second terminals respectively corresponding to drain and source terminals of the transistor.

According to an embodiment, the switch has a switching frequency in the range from 0.1 MHz to 100 MHz, preferably in the range from 1 to 10 MHz, more preferably equal to approximately 1.5 MHz.

According to an embodiment, the converter further comprises a piezoelectric resonator adapted to delivering the first voltage.

According to an embodiment, the second circuit comprises:
a comparator of the average of said values with a threshold;
a corrector; and
a pulse-width modulation circuit.

According to an embodiment, the threshold is a function of a power consumption of a load powered by the converter.

An embodiment provides a method of controlling a power converter such as described, comprising the steps of:
a) averaging the minimum values of the first AC voltage after a plurality of halfwaves; and
b) adjusting a turn-on time of the switch according to the average of said values.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the applications using the power converters are not detailed, the described embodiments being compatible with usual applications implementing power converters.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
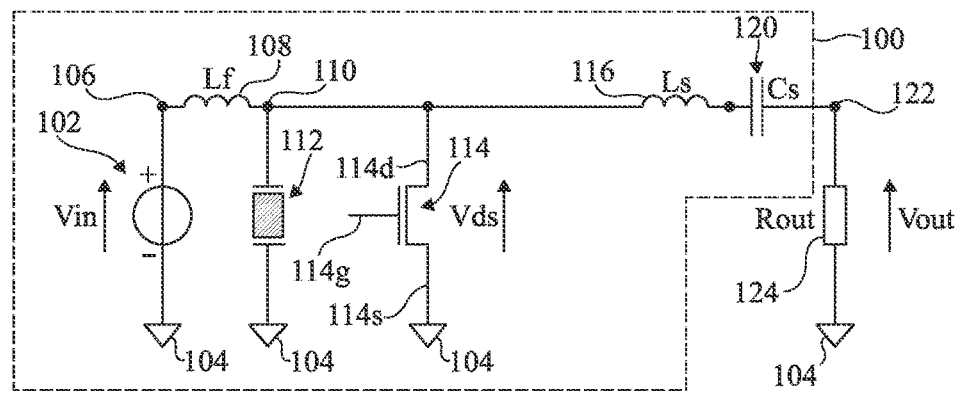
FIG. 1 partially and schematically shows an example of a power converter.

FIG. 1 partially and schematically shows an example of a power converter 100. The converter 100 illustrated in FIG. 1 is more precisely an inverter of L-piezo type.

In the shown example, converter 100 comprises a source 102 for delivering a DC voltage Vin. Source 102 comprises a negative terminal (−) coupled, preferably connected, to a node 104, or a rail, of application of a reference potential, for example, the ground. Source 102 further comprises another positive terminal (+) coupled, preferably connected, to another node 106.

A first inductive element 108 of inductance Lf, for example, a coil, couples, preferably connects, node 106 to still another node 110 of converter 100.

In the shown example, converter 100 comprises a piezoelectric element 112 (typically a resonator) coupling, preferably connecting, nodes 110 and 104.

A switch 114 couples, preferably connects, nodes 110 and 104. Switch 114 is for example a field-effect power transistor (FET), for example, a MOS (Metal-Oxide-Semiconductor) transistor. Switch 114 is preferably an N-channel MOS transistor, or NMOS transistor.

As a variant, the switch is a high electron mobility transistor (HEMT). In this case, transistor 114 is preferably a HEMT transistor based on gallium nitride (GaN).

Switch 114 comprises a first conduction terminal 114d (drain) coupled, preferably connected, to node 110 and another conduction terminal 114s (source) coupled, preferably connected, to node 104. Switch 114 further comprises a third control terminal 114g (gate).

As an example, the switch 114 of converter 100 has a switching frequency (set by a control circuit, not shown) in the range from 0.1 MHz to 100 MHz, preferably in the range from 1 to 10 MHz, more preferably equal to approximately 1.5 MHz.

The periodic switching of switch 114 causes the generation, by piezoelectric element 112, of an oscillating signal, for example, a periodic sinusoidal signal. In the shown example, an AC voltage Vds is present between the drain and source terminals 114d and 114s of transistor 114.

In the case of an NMOS transistor, transistor 114 is in an on state when a voltage Vgs greater than or equal to a threshold voltage Vth1 is applied between its gate terminal 114g and its source terminal 114s and in an off state when voltage Vgs is lower than threshold voltage Vth1.

In the shown example, power converter 100 further comprises a second inductive element 116 of inductance Ls, for example, a coil, in series with a capacitive element 120 of capacitance Cs, for example, a capacitor, between terminal 110 and an output terminal 122 of the converter.

A load, for example, resistive, symbolized in FIG. 1 by a resistor 124 of value Rout, is intended to be coupled, preferably connected, between output terminal 122 and node 104 of application of the reference potential.

In operation, source 102 applies DC voltage Vin between the nodes 106 and 104 of converter 100. Transistor 114 applies, between nodes 110 and 104, AC voltage Vds, which results in having piezoelectric element 112 oscillate. AC voltage Vds is filtered by this element 112, by second inductive element 116, and by capacitive element 120, before being applied across load 124. Typically, the LC filter formed by elements 116 and 120 enables to ascertain that the voltage Vout generated between nodes 122 and 104 is a sinusoidal voltage corresponding to voltage Vds, at least only one fundamental component of which is kept.

More precisely, transistor 114 is typically controlled in pulse-width modulation (PWM) to generate AC voltage Vds which is particularly filtered by piezoelectric element 112 to obtain the desired voltage Vds. The switching frequency of transistor 114 is substantially constant and equal to half the oscillation frequency of piezoelectric resonator 112. After each switching from the off state to the on state, transistor 114 is maintained all the longer in the on state as the power required by load 124 is high. Conversely, switch 114 is for example maintained all the shorter in the on state as the power required by load 124 is low.

Figure 2:
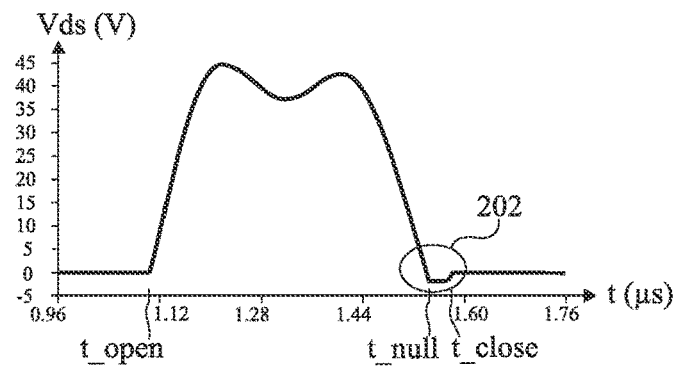
FIG. 2 is a graph of an example of variation of a voltage across a switch of the converter of FIG. 1.

FIG. 2 is a graph of an example of variation, according to time t, of the voltage Vds across the transistor 114 of the converter 100 of FIG. 1. FIG. 2 more precisely illustrates an example of a shape of a positive halfwave of voltage Vds.

In the shown example, transistor 114 is turned on at a time t_close and then turned off at a time t_open. From time t_open, a voltage appears between the first and second conduction terminals 114d, 114s of transistor 114. Little before the turn-off time t_close of transistor 114 (box 202), voltage Vds becomes negative. This causes the flowing of a low current in a reverse diode of transistor 114. At time t_close, voltage Vds becomes zero and the flowing of the current between the first and second conduction terminals 114d, 114s of transistor 114 is then interrupted.

Time t_close approximately corresponds to a time when the voltage Vgs applied between the gate and source terminals 114g and 114s of transistor 114 becomes greater than or equal to the threshold voltage Vth1 of this transistor. At time t_close, transistor 114 then becomes substantially conducting. Time t_open approximately corresponds to a time when voltage Vgs becomes strictly smaller than threshold voltage Vth1. At time t_open, transistor 114 then becomes substantially non-conducting.

At a time t_null, prior to the turn-on time t_close of transistor 114 (box 202) and close to time t_close, the voltage Vds between the nodes 110 and 104 of converter 100 is substantially null. At time t_close, voltage Vds is for example in the range from −0.1 to −2 V. In the example illustrated in FIG. 2, voltage Vds is more precisely equal to approximately −2 V at time t_close.

The example shown in FIG. 2, where transistor 114 is on when voltage Vds is negative and close to 0 V, corresponds to a case called quasi zero voltage switching or quasi ZVS. In this case, the switching causes few disturbances of converter 100 and generates low power losses at the level of transistor 114.

Figure 3:
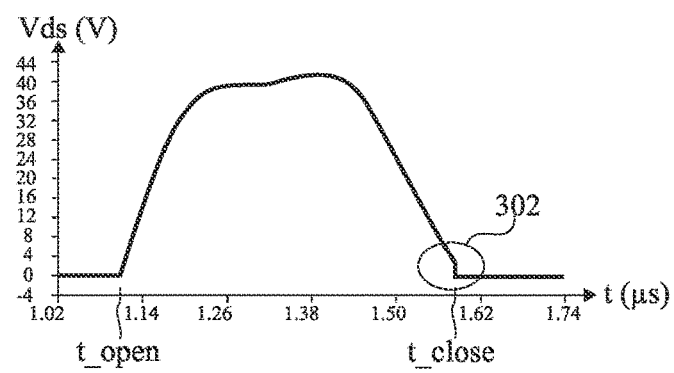
FIG. 3 is a graph of another example of variation of the voltage across the switch of the converter of FIG. 1.

FIG. 3 is a graph of another example of variation of the voltage Vds across the transistor 114 of the converter 100 of FIG. 1. FIG. 3 more precisely illustrates an example of shape of another positive halfwave of AC voltage Vds.

In the shown example, in the vicinity of the turn-on time t_close of transistor 114 (box 302), the voltage Vds between the nodes 110 and 104 of converter 100 is positive. At time t_close, voltage Vds is for example in the range from 0.5 to 5 V. In the example illustrated in FIG. 3, voltage Vds is more precisely equal to approximately 4 V at time t_close.

The example shown in FIG. 3, where transistor 114 is on when voltage Vds is positive and for example equal to several volts, corresponds to a case called hard switching, or abrupt switching. In this case, the switching causes strong disturbances of converter 100 and generates significant power losses at the level of transistor 114. More precisely, in the example illustrated in FIG. 3, the hard switching causes just after time t_close a very fast variation dVs/dt of the voltage Vds across transistor 114. This results in a strong current peak in transistor 114, capable of causing an irreversible damage of this transistor.

Accordingly, it is generally desired to avoid abrupt switchings of the type of that illustrated in FIG. 3 and switchings of quasi-ZVS type are rather preferred, as discussed hereabove in relation with FIG. 2. For this purpose, converter 100 is initially set so that the switching at time t_close is performed in quasi ZVS by adjusting control parameters of transistor 114. Due in particular to variations of the power consumed by load 124 and to variations of physical characteristics of elements of converter 100 (for example, fluctuations of the value of inductance Lf and of the resonance frequency of piezoelectric resonator 112), it is however difficult to maintain an operation of this type.

Typically, manufacturing tolerances of the elements of converter 100, ambient temperature variations, a phenomenon of aging of the elements, etc. cause little by little a drift in the operation resulting in a loss of the quasi-ZVS switching.

To overcome this problem, a pulse disturbance detection circuit, for example, a circuit for detecting the voltage slope analog to the circuit disclosed in S. Li, W. Shu, and S. Lu's publication, entitled "Voltage slope-based zero voltage switching detection method for wireless power transfer systems" (Electron. Lett., vol. 54, no 12, p. 775 777, 2018) could have been provided. However, such a circuit would not be adaptable to a converter of the type of the converter 100 of FIG. 1 comprising a single switch 114. Further, the circuit described in the above-mentioned publication requires the use of active elements or components intended to reset detection information at each period. This causes an additional electric power consumption, correspondingly decreasing the power efficiency of the converter.

A circuit of detection by source voltage sampling, for example, similar to the circuit described in U.S. Pat. No. 5,166,549, could also have been provided. Such a circuit for example takes advantage of a resistor associated in series with a power converter to detect a switching in the vicinity of the voltage zero of this switch. This however requires adding an element, in the case in point a resistor, inside of the power loop of the converter. This resistor disadvantageously generates an increase in the power losses of the converter, and thus adversely affects its efficiency.

Figure 4:
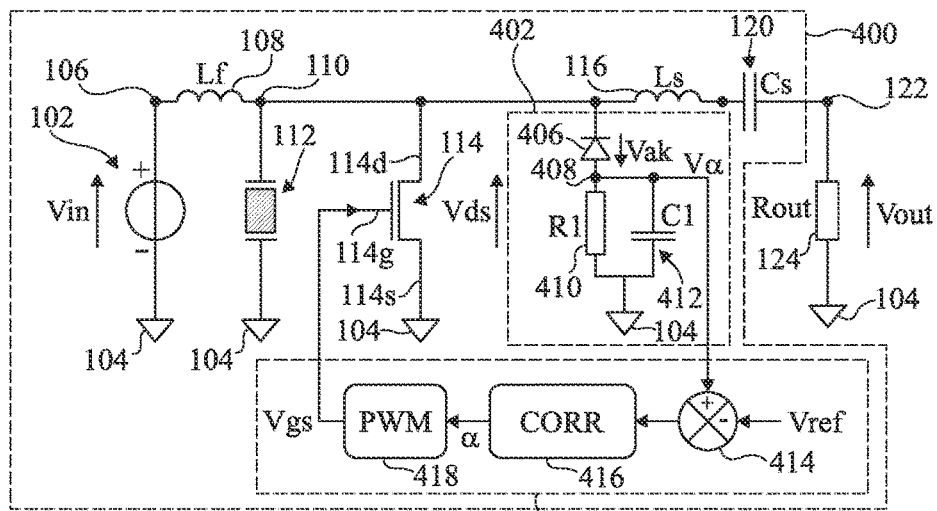
FIG. 4 partially and schematically shows a power converter according to a first embodiment.

FIG. 4 schematically and partially shows a power converter 400 according to an embodiment. The converter 400 of FIG. 4 comprises elements common with the converter 100 of FIG. 1. These common elements will not be described again hereafter.

The converter 400 of FIG. 4 differs from the converter 100 of FIG. 1 mainly in that converter 400 further comprises a first detection circuit 402 and a second control circuit 404.

According to an embodiment, first circuit 402 is a circuit for detecting a minimum value reached by AC voltage Vds at each halfwave and for averaging of this minimum value over a plurality of halfwaves of this voltage.

In the shown example, circuit 402 comprises a halfwave rectification element 406. Halfwave rectification element 406 is for example, as illustrated in FIG. 4, a diode having an anode coupled, preferably connected, to a node 408 of circuit 402 and having a cathode coupled, preferably connected, to a node 408 of circuit 402 and having a cathode coupled, preferably connected, to the node 110 of converter 400. Diode 406 is conducting when the voltage Vak between its anode and its cathode is greater than or equal to a threshold voltage Vth2 of this diode and is otherwise non-conducting. For simplification, it is assumed that diode 406 is never submitted to a reverse bias voltage sufficiently high to have it enter the avalanche state. As an example, the threshold voltage Vth2 of diode 406 is in the range from 0.2 to 0.7 V, for example, equal to approximately 0.6 V for a silicon diode.

In the rest of the disclosure, note Vα the potential present at node 408.

In the shown example, circuit 402 further comprises a resistor 410, of value R1, associated in parallel with another capacitive element 412, for example, a capacitor of capacitance C1. Resistor 410 comprises a terminal coupled, preferably connected, to node 408 and another terminal coupled, preferably connected, to the node 104 of application of the reference potential. Similarly, capacitive element 412 comprises a terminal coupled, preferably connected, to node 408 and another terminal coupled, preferably connected, to node 104. Resistor 410 may be made in the form of a MOS transistor biased as a current source.

The role of RC cell 410-412 is to average, over a plurality of halfwaves of voltage Vds, the minimum value that it reaches.

The role of diode 406 is to conduct an electric current between nodes 110 and 408 when voltage Vds is smaller than or equal to potential Vα minus a voltage drop across this diode. This then causes a decrease in the voltage across capacitor 412. However, diode 406 prevents any flowing of a current between nodes 110 and 408 when voltage Vds is greater than potential Vα plus the voltage drop across this diode.

During a halfwave of voltage Vds, voltage Vds increases for example from the turn-off time t_open of transistor 114, and then decreases in the vicinity of the turn-on time t_close of this transistor. It is assumed, as previously discussed in relation with FIG. 2, that voltage Vds is negative at time t_close. If voltage Vds further has a value sufficiently low for the voltage Vak across diode 406 to be greater than or equal to its threshold voltage Vth2, diode 406 is then conducting. This tends to charge node 408, and thus to decrease the potential Vα present at this node. This decrease is all the faster as voltage Vds is low. Thus, the higher the value of voltage Vds, the higher potential Vα.

Functionally, the first circuit 402 of converter 400 acts as a detector of the lower envelope of voltage Vds.

During a next halfwave of voltage Vds, the increase of voltage Vds from the turn-off time t_open of transistor 114 causes a blocking of diode 406. Node 408 is then isolated from node 110. This thus causes a discharge of node 408 to the node 104 of application of the reference potential, and thus a decrease in potential Vα. This decrease of potential Vα is however damped or filtered, on successive halfwaves of voltage Vds, by the parallel association of resistor 410 and of capacitor 412.

Resistor R1 and capacitor C1 are for example such that first circuit 402 has a time constant τ, equal in this example to the product of resistor R1 by capacitor C1 (τ=R1*C1), at least five times greater, for example at least ten times greater, than a period of AC voltage Vds. This thus enables to average, or smooth, values taken by potential Vα over a plurality of halfwaves of voltage Vds. Potential Vα is for example applied to an input of second circuit 404. As an example, if the switching frequency of transistor 114 is approximately equal to 10 MHz, time constant τ is in the order of one microsecond.

According to an embodiment, second circuit 404 is a circuit for controlling transistor 114 configured, according to the average of the values of potential Vα, to control the turning on of transistor 114 when voltage Vds is substantially null. Circuit 404 enables to ascertain that the turn-on time t_close of transistor 114 intervenes when voltage Vds is, for example, in the range from 0 to −1 V.

Generally, the average of the values of potential Vα enables to estimate whether converter 400 is in the quasi-ZVS operating mode, which is desired to be maintained, or whether it approaches the hard switching operating mode, which is desired to be avoided. Second circuit 404 is configured to maintain converter 400 in the quasi-ZVS operating mode where the switching (time t_close) is performed when voltage Vds is negative and close to the voltage zero, despite drifts and the aging of the components of the converter.

In the shown example, circuit 404 comprises a comparator 414. Comparator 414 for example comprises an input (+) coupled, preferably connected, to the node 408 of circuit 402 and receiving potential Vα. Comparator 414 for example comprises another input (−) of comparison with a threshold, the other input for example receiving a reference potential Vref. This other input of the comparator is for example coupled to a node, not shown, of application of reference potential Vref. Reference potential Vref is adjusted to obtain a quasi-ZVS operation. In the shown example, the value of potential Vref is equal to approximately 0.1 V.

In the shown example, an output of comparator 414 is connected to an input of a corrector 416 (CORR). The comparator output for example transmits to the input of corrector 416 a signal which is an image of a difference of potential Vα with respect to reference signal Vref. As an example, corrector 416 is a proportional integral (PI) regulator. Corrector 416 for example enables to obtain a regulation loop more stable than if circuit 404 comprised no corrector.

In this example, corrector 416 outputs a signal a. Signal a for example corresponds to a DC voltage which is an image of a duty cycle to be applied to the transistor after the pulse-width modulation. For simplification, signal a will be designated with the term "duty cycle" in the rest of the disclosure.

In the shown example, the signal a at the output of corrector 416 is transmitted to an input of a pulse-width modulation (PWM) circuit 418. Circuit 418 is for example adapted to adjusting the turn-on and turn-off times t_close and t_open of transistor 114 according to signal a. More precisely, in the shown example, the output of circuit 418 is connected to the gate 114g of transistor 114 and delivers signal Vgs to gate 114g.

Generally, first and second circuits 402, 404 enable to estimate, according to the average of the values of potential Vα, a difference in the operation of converter 400 with respect to an operation where transistor 114 is off when voltage Vds is negative and close to 0 V ("quasi ZVS" operation). Circuits 402 and 404 further enable to adjust duty cycle a according to this difference to maintain the quasi-ZVS operation of converter 400.

An advantage of converter 400 lies in the fact that it is capable of compensating for drifts, for example, inductance variations Lf of coil 108 and fluctuations of the resonance frequency of resonator 112 over time. This advantageously enables converter 400 to have a greater power efficiency than the converter 100 of FIG. 1, as well as an increased lifetime.

Another advantage of converter 400 lies in the fact that circuit 404 for regulating the duty cycle a of transistors 114 allows modifications of the output power of this converter while maintaining the switching of transistor 114 to the off state when voltage Vds is negative and close to zero. As an example, for a 1.4-MHz frequency under 20 V, converter 400 is capable of maintaining a quasi-ZVS operation over a power range between 0 and 24 W, to be compared with between 9 and 21 W for the inverter 100 of FIG. 1.

Still another advantage of converter 400 lies in the fact that it exhibits no power dissipation at the level of the power circuit. Further, converter 400 undergoes no degradation of the control of MOS transistor 114.

As a variant, diode 406 and the parallel association of resistor 410 and of capacitor 412 may be interchanged. In this case, diode 406 more precisely has its anode coupled, preferably connected, to node 104 of application of the reference potential and its cathode coupled, to node 408. Resistor 410 and capacitor 412 then each have a terminal coupled, preferably connected, to node 408 and another terminal coupled, preferably connected, to node 110.

Figure 5:
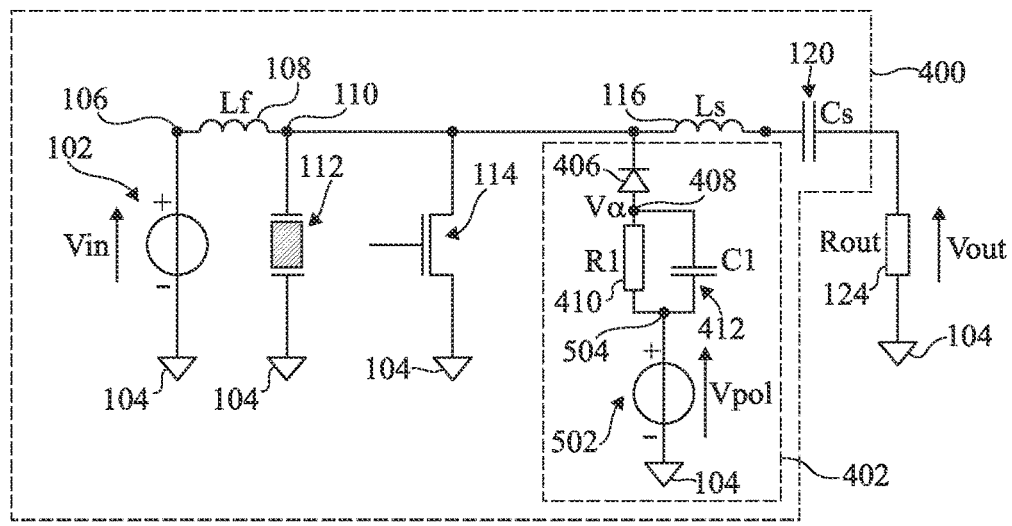
FIG. 5 partially and schematically shows a variant of the converter of FIG. 4.

FIG. 5 partially and schematically shows a variant of the converter 400 of FIG. 4. The circuit 404 of converter 400 has not been shown in FIG. 5 to avoid overloading the drawing.

The variant illustrated in FIG. 5 differs from the embodiment illustrated in FIG. 4 mainly in that, in this variant, the first circuit 402 of converter 400 further comprises a source 502 of a substantially constant DC voltage Vpol. Source 502 is for example coupled, preferably connected, between node 104 of application of the reference potential and the parallel association of resistor 410 and of capacitor 412. Source 502 more precisely comprises a negative terminal (−) coupled, preferably connected, to node 104 and another positive terminal (+) coupled, preferably connected, to a node 504 of circuit 402.

Bias voltage Vpol is approximately equal to the threshold voltage Vth2 of diode 406. Advantage is thus taken of source 502 to compensate for the threshold voltage Vth2 of diode 406. This enables to still more easily couple potential Vα to the lower envelope of AC voltage Vds to estimate whether converter 400 is in the quasi-ZVS operating mode or whether it diverges therefrom.

Figure 6:
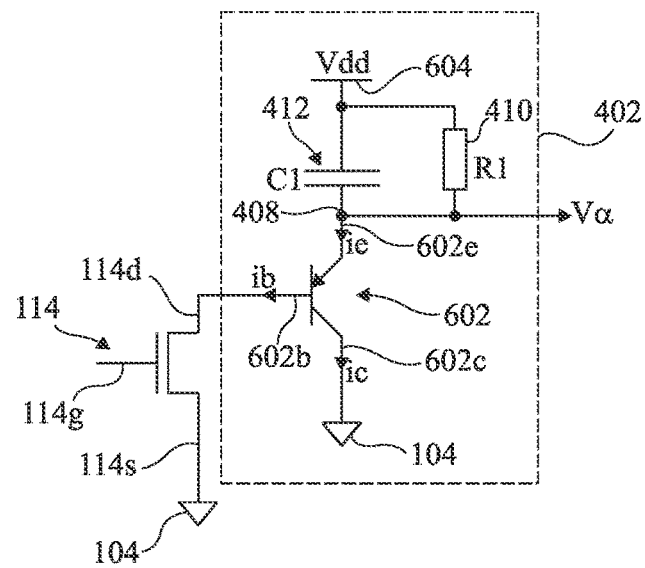
FIG. 6 partially and schematically shows a variant of a circuit of the converter of FIG. 4.

FIG. 6 partially and schematically shows a variant of the circuit 402 of the converter 400 of FIG. 4.

In this variant, the diode 406 of circuit 402 is replaced with a bipolar transistor 602, of PNP type. Transistor 602 is for example connected to obtain a function similar to that of diode 406. More precisely, in the shown example, transistor 602 comprises a first conduction terminal 602c (collector) coupled, preferably connected, to the node 104 of application of the reference potential, a second conduction terminal 602e (emitter) coupled, preferably connected, to node 408, and a third control terminal 602b (base) coupled, preferably connected, to the drain terminal 114d of transistor 114.

Further, in this variant, the parallel association of resistor 410 and of capacitor 412 is not connected between node 408 and node 104 but between node 408 and another node 604, or a rail, of application of a power supply potential Vdd of circuit 402. As an example, potential Vdd is substantially constant and in the range from 2 to 5 V, for example, equal to approximately 3 V.

The gain of transistor 602 is selected to be at least 50, so that collector current ic is much higher (by a ratio of at least 50) than the base current ib drawn by transistor 114 when the latter is on (the sum of the base and collector currents being, for a PNP-type transistor, equal to the emitter current sampled from node 408).

The role of transistor 602 is to avoid for charges/discharges of capacitor 412 to disturb the operation of transistor 114.

The variant of circuit 402 discussed in relation with FIG. 6 has an operation similar to that of the circuit 402 of FIG. 4. The variant of FIG. 6 however enables the capacitance C1 of capacitor 412 to be higher than in the case of the embodiment of FIG. 4, which enables to decrease voltage drifts linked to leakage currents.

Figure 7:
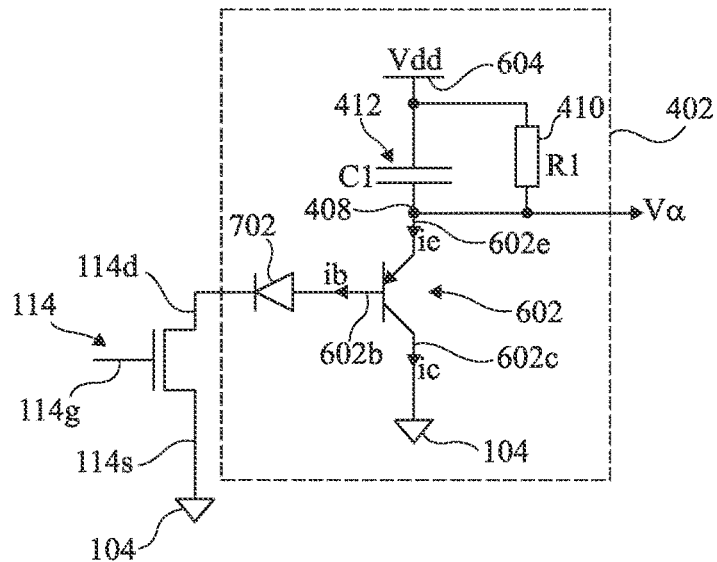
FIG. 7 partially and schematically shows another variant of a circuit of the converter of FIG. 4.

FIG. 7 partially and schematically shows another variant of the circuit 402 of the converter 400 of FIG. 4.

The variant of circuit 402 illustrated in FIG. 7 differs from the variant of circuit 402 illustrated in FIG. 6 in that circuit 402 further comprises another halfwave rectification element 702. Halfwave rectification element 702 is for example a diode or a zener diode having an anode coupled, preferably connected, to the base terminal 602*b* of bipolar transistor 602 and having a cathode coupled, preferably connected, to the drain terminal 114*d* of power transistor 114.

Diode 702 advantageously enables to avoid for transistor 602 to be forced to withstand, between its terminals 602*b* and 602*e*, a significant reverse voltage Vbe when transistor 114 is off. Another advantage of this variant lies in the fact that diode 702 enables to increase potential Vα and to ascertain that this potential is in a voltage range higher than for the variant of FIG. 6. As an example, potential Vα is in this case in the range from 0 V to Vdd. It is thus avoided for potential Vα to be negative, which eases the regulation by second circuit 404.

Although this has not been shown in FIGS. 6 and 7, potential Vα is for example transmitted to second circuit 404 to adapt the control of transistor 114 as previously discussed in relation with FIG. 4.

Figure 8:
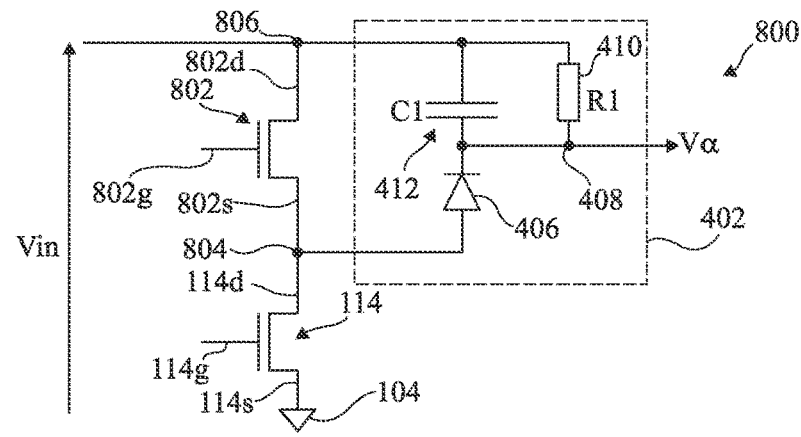
FIG. 8 partially and schematically shows a portion of a power converter according to a second embodiment.

FIG. 8 partially and schematically shows a portion of a power converter 800 according to an embodiment.

The converter 800 of FIG. 8 comprises elements common with the converter 400 of FIG. 4. These common elements will not be described again hereafter.

The converter 800 of FIG. 8 differs from the converter 400 of FIG. 4 mainly in that converter 800 comprises, in addition to switch 114, another switch 802. Switch 802 is for example a MOS transistor, similar to switch 114.

The terminal 114*s* of transistor 114 is coupled, preferably connected, to node 104 and the terminal 114*d* of transistor 114 is coupled, preferably connected, to a node 804 of converter 800.

Transistor 802 has a first conduction terminal 802*s* (source) coupled, preferably connected, to node 804 and a second conduction terminal 802*d* (drain) coupled, preferably connected, to another node 806 of converter 800. Potential Vin is present between nodes 806 and 104.

Diode 406 has its anode terminal coupled, preferably connected, to node 804 and its cathode terminal coupled, preferably connected, to node 408. The parallel association of resistor 410 and of capacitor 412 is coupled, preferably connected, between nodes 408 and 806.

In the shown example, the series association of transistors 802 and 114 between nodes 806 and 104 forms part of a bridge arm of converter 800.

The potential Vα present at node 408 is a function of a peak potential present on the source terminal 802*s* of transistor 802. Although this has not been shown in FIG. 8, converter 800 preferably comprises a regulation circuit or loop similar to the circuit 404 discussed in relation with FIG. 4. The regulation circuit of converter 800 then enables to maintain the peak potential present on terminal 802*s* between voltage Vin and a voltage equal to Vin plus an inverse voltage of transistor 802, corresponding to a conduction voltage of a reverse diode of this transistor. The peak voltage is greater and substantially equal to voltage Vin.

As a variant, a bias source may be interposed between the node 806 of converter 800 and the parallel association of resistor 410 and of capacitor 412. This voltage source provides advantages similar to those discussed in relation with FIG. 5 for the source 502 of voltage Vpol.

Figure 9:
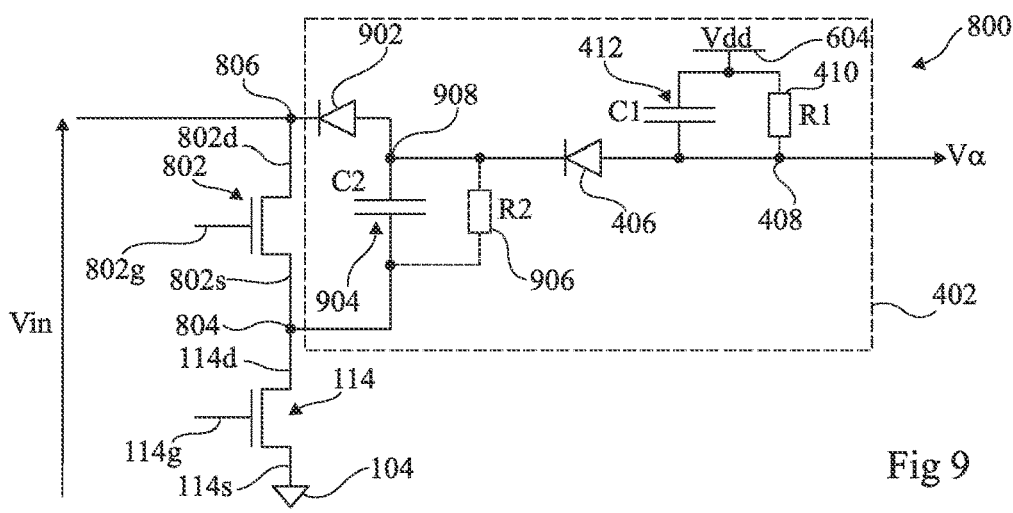
FIG. 9 partially and schematically shows a variant of the portion of the converter of FIG. 8.

FIG. 9 partially and schematically shows a variant of the portion of the converter 800 of FIG. 8.

The variant illustrated in FIG. 9 differs from the embodiment illustrated in FIG. 8 mainly in that the first circuit 402 of converter 800 further comprises another halfwave rectification element 902, another capacitor element 904 and, optionally, another resistor 906.

Halfwave rectification element 902 is a diode having an anode coupled, preferably connected, to a node 908 of converter 800 and having a cathode coupled, preferably connected, to node 806. Diode 902 is for example similar to diode 406.

Capacitive element 904 comprises a terminal coupled, preferably connected, to node 908 and another terminal coupled, preferably connected, to node 804. Capacitive element 904, having a capacitance C2, is for example a capacitor similar to capacitor 412.

Optional resistor 906, having a value R2, is associated in parallel with capacitive element 904. Resistor 906 comprises a terminal coupled, preferably connected, to node 908 and another terminal coupled, preferably connected, to node 804.

Further, the anode of diode 406 is coupled, preferably connected, to node 408 and the cathode of diode 406 is coupled, preferably connected, to node 908. In this example, the parallel association of resistor 410 and of capacitor 412 is coupled, preferably connected, between nodes 408 and 604.

Further, capacitor 412 is connected between node 408 and node 604. As a variant, capacitor 412 is connected between node 408 and another node of application of a fixed potential, for example, the node 104 of application of the reference potential.

The variant of the converter 800 illustrated in FIG. 9 advantageously enables to ascertain that potential Vα varies in a larger voltage range than for the converter 800 of FIG. 8. Potential Vα is in this case in the range for example from 0 V to Vdd.

In operation, when transistor 114 is on and when transistor 802 is off, node 804 is taken to a potential substantially equal to that of node 104. Resistor 410 in parallel with capacitive element 412 forms a filter enabling, after a plurality of halfwaves, to store at node 408 a minimum value of a potential difference between nodes 604 and 408 (to within voltage drops in diode 406). If the capacitance C2 of capacitor 904 is much higher, for example from ten to one hundred times higher, than the capacitance C1 of capacitor 412, a charge transfer between capacitors 904 and 412 will have little influence on a potential difference across capacitor 904. In this case, potential Vα will rapidly stabilize, that is, after a few halfwaves only (less than 10 halfwaves).

However, if the capacitance C2 of capacitor 904 is much lower, for example, between ten and one hundred times lower, than the capacitance C1 of capacitor 412, a charge transfer between capacitors 904 and 412 will have a high influence on the potential difference across capacitor 904. In this case, potential Vα will stabilize slowly, that is, after a large number of halfwaves (at least 10 halfwaves).

When transistor 114 is switched to the off state and transistor 802 has not switched to the on state yet, the source terminal 802s of transistor 802 exhibits a potential which increases, for example due to a LC resonance. This potential may for example exceed voltage Vin. In this case, capacitive element 904 stores the peak value of the potential present on the source terminal 802s of transistor 802 with respect to potential Vin, to within the voltage drops in diode 902.

In a case where optional resistor 906 is present, this resistor enables to filter the voltage across capacitor 904 when transistor 114 turns on. High-frequency disturbances causes by the turning on of transistors 114 are thus advantageously removed or decreased.

As a variant, each diode 406, 902 may be replaced with a zener diode. This particularly enables to adjust the range within which potential Vα varies.

Figure 10:
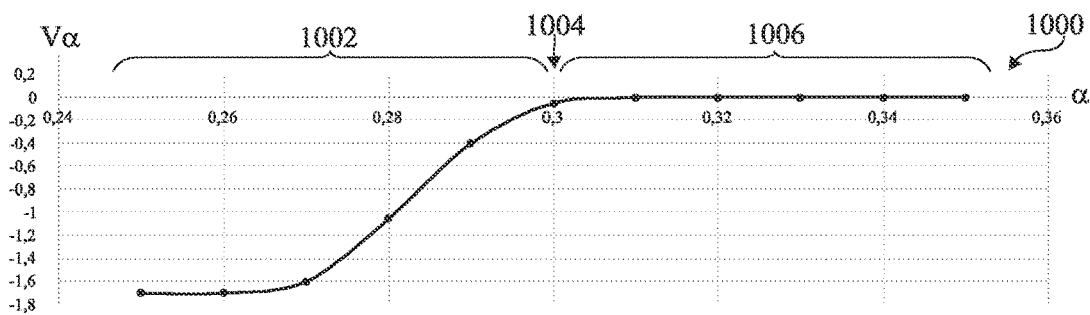
FIG. 10 is a graph of the variation of a potential of the converter of FIG. 4 according to a duty cycle of a switch.

FIG. 10 is a graph 1000 of the variation of the potential Vα present at the node 408 of converter 400 of FIG. 4 according to duty cycle a.

In the shown example, graph 1000 comprises a first region 1002 where duty cycle a is in the range from approximately 0.25 to approximately 0.30. First region 1002 corresponds to the quasi-ZVS operating mode, where converter 400 is maintained. In region 1002, potential Vα increases with duty cycle a. By averaging the values of potential Vα over a plurality of halfwaves, duty cycle a can be adjusted as discussed in relation with FIG. 4 to approach a switching point 1004 at the voltage zero. Point 1004 corresponds to a value of duty cycle a for which transistor 114 is turned on at the time t_close when voltage Vds is null.

Graph 1000 further comprises a second region 1006 where duty cycle a is in the range from approximately 0.30 to approximately 0.35. Second region 1006 corresponds to the hard switching operating mode, that converter 400 is prevented from reaching due to the previously-described control.

Although this has not been shown in FIG. 10, the variants of converter 400 discussed in relation with FIGS. 5, 6, and 7 as well as the converter 800 of FIGS. 8 and 9 for example exhibit potential variations Vα, according to duty cycle a, similar to what is illustrated in FIG. 10 for the converter 400 of FIG. 4, to within a vertical offset.

Figure 11:
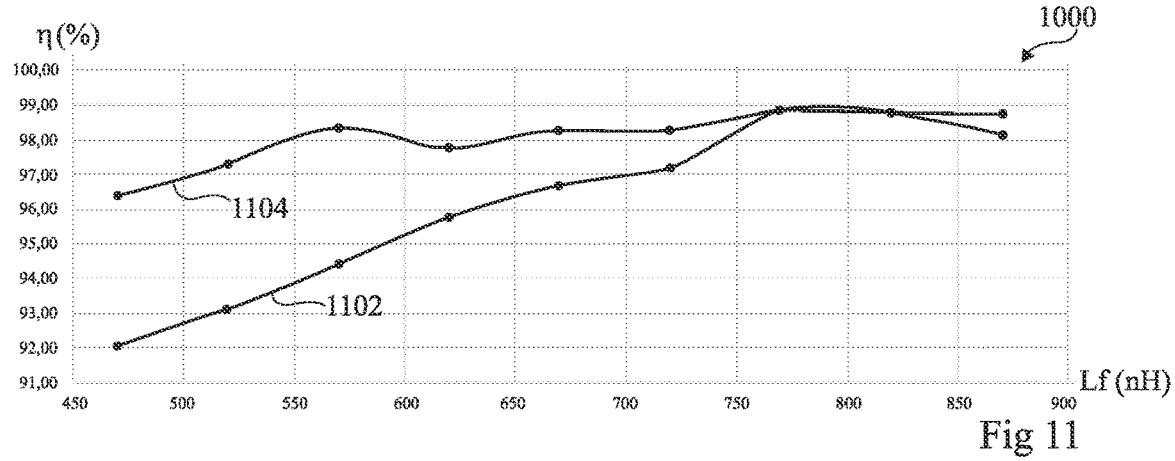
FIG. 11 is a graph of the variation of an efficiency of the converters of FIGS. 1 and 4 according to an inductance of an inductive element of these converters.

FIG. 11 is a graph 1100 of variation of an efficiency η (in percent, %) of the converters 100 and 400 of FIGS. 1 and 4 according to an inductance Lf (in nanohenries, nH) of an inductive element 108 of these converters.

FIG. 11 more precisely comprises a first curve 1102 illustrating the variation of the efficiency η of converter 100 and a second converter 1104 illustrating the variation of the efficiency η of converter 400. In FIG. 11, if can be observed that the efficiency η of converter 400 is substantially always greater than the efficiency 11 of converter 100. In particular, when inductance Lf is equal to approximately 500 nH, the efficiency η of converter 400 is equal to approximately 96.5%, to be compared with 92% for converter 100.

Although this has not been shown in FIG. 11, the variants of converter 400 discussed in relation with FIGS. 6 and 7 as well as the converter 800 of FIGS. 8 and 9 exhibit variations of efficiency η, according to inductance Lf, similar to curve 1104.

Various embodiments and variants have been described. Those skilled in the art will understand that certain features of these various embodiments and variants may be combined, and other variants will occur to those skilled in the art. In particular, although examples of application to piezoelectric resonator converters have been discussed hereabove, the described embodiments are not limited to this type of converter, and those skilled in the art are particularly capable of adapting the described embodiments to converters of class E, E2, phi2, etc.

Finally, the practical implementation of the described embodiments and variants is within the abilities of those skilled in the art based on the functional indications given hereabove. In particular, the selection of the values of inductances Lf and Ls, of resistors R1 and R2, of capacitive elements C1, C2, and Cs, etc. is within the abilities of those skilled in the art.

What is claimed is:

1. Power converter comprising:
a switch comprising first and second conduction terminals intended to receive a first AC voltage;
a first circuit for detecting a minimum value reached by the first voltage at each halfwave, and for averaging minimum values over a plurality of halfwaves, the first circuit further comprising, between a first node coupled to the first conduction terminal of the switch and a second node of application of a reference potential, a halfwave rectification element in series with a parallel association of a capacitive element and of a resistor; and
a second circuit for controlling the switch configured, according to the average of said values, to turn on the switch when the first voltage is substantially null.

2. Converter according to claim 1, wherein the first circuit has a time constant at least five times greater than a period of the first voltage.

3. Converter according to claim 1, wherein a third node, located between the halfwave rectification element and the parallel association of the capacitive element and of the resistor, exhibits a potential which is a function of a lower envelope of the first voltage.

4. Converter according to claim 1, wherein the halfwave rectification element is a diode.

5. Converter according to claim 1, wherein the first circuit further comprises a source of a voltage coupled between the parallel association of the capacitive element and of the resistor and the second node.

6. Converter according to claim 1, wherein the second circuit is further configured to modify a duty cycle of the switch according to the average of said values.

7. Converter according to claim 1, wherein the switch is a field-effect transistor, the first and second terminals respectively corresponding to drain and source terminals of the transistor.

8. Converter according to claim 1, wherein the switch has a switching frequency in the range from 0.1 MHz to 100 MHz.

9. Converter according to claim 1, further comprising a piezoelectric resonator adapted to delivering the first voltage.

10. Converter according to claim 1, wherein the second circuit comprises:
a comparator of the average of said values with a threshold;
a corrector; and
a pulse-width modulation circuit.

11. Converter according to claim 10, wherein the threshold is a function of a power consumption of a load powered by the converter.

12. A method of controlling the converter according to claim 1, the method comprising the following steps:
 a) averaging the minimum values of the first AC voltage after a plurality of halfwaves; and
 b) adjusting a turn-on time (t_close) of the switch according to the average of said values.

* * * * *